(12) United States Patent
Poghosyan

(10) Patent No.: US 11,848,919 B1
(45) Date of Patent: Dec. 19, 2023

(54) PATTERNLESS OBFUSCATION OF DATA WITH LOW-COST DATA RECOVERY

(71) Applicant: Akamai Technologies, Inc., Cambridge, MA (US)

(72) Inventor: Kristine Poghosyan, Morgan Hill, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 260 days.

(21) Appl. No.: 17/644,018

(22) Filed: Dec. 13, 2021

(51) Int. Cl.
H04L 9/40 (2022.01)

(52) U.S. Cl.
CPC .................... H04L 63/0428 (2013.01)

(58) Field of Classification Search
CPC .................................................. H04L 63/0428
USPC ........................................................ 726/26
See application file for complete search history.

(56) References Cited

U.S. PATENT DOCUMENTS

| | | | | |
|---|---|---|---|---|
| 8,914,859 B2* | 12/2014 | Erickson | ............. | H04L 63/0428 |
| | | | | 713/157 |
| 9,021,262 B2* | 4/2015 | Krajec | .................... | G06F 21/52 |
| | | | | 713/167 |
| 9,094,396 B2* | 7/2015 | Soni | ........................ | G06Q 10/00 |
| 9,923,874 B2* | 3/2018 | Wan | .................... | H04L 63/0428 |
| 10,298,545 B2* | 5/2019 | Boivie | ................ | G06F 21/6245 |
| 10,803,197 B1* | 10/2020 | Liao | ..................... | G06F 21/604 |
| 11,134,063 B2 | 9/2021 | Reshadi et al. | | |
| 2006/0075500 A1 | 4/2006 | Bertman et al. | | |
| 2011/0107077 A1 | 5/2011 | Henderson et al. | | |
| 2012/0124372 A1 | 5/2012 | Dilley et al. | | |
| 2013/0014267 A1* | 1/2013 | Farrugia | .................. | H04L 69/03 |
| | | | | 726/26 |
| 2013/0332731 A1* | 12/2013 | Tateishi | ............ | G06F 16/90344 |
| | | | | 713/168 |
| 2014/0208445 A1* | 7/2014 | DeLuca | .................. | H04W 4/12 |
| | | | | 726/30 |
| 2016/0006703 A1* | 1/2016 | Boivie | ................ | H04L 63/0428 |
| | | | | 713/165 |
| 2016/0255054 A1* | 9/2016 | Wan | ........................ | H04L 45/74 |
| | | | | 713/160 |
| 2020/0210608 A1* | 7/2020 | Toshok | ................. | H04L 63/123 |
| 2021/0034718 A1 | 2/2021 | Mantin | | |
| 2022/0255904 A1* | 8/2022 | Bax | ........................ | G06N 20/00 |

OTHER PUBLICATIONS

Armenian/Alphabet—Wikibooks, open books for an open world, 5 pages., Downloaded on Oct. 27, 2021. https://en.wikibooks.org/wiki/Armenian/Alphabet.

Katz, O. , "Akamai Blog, Catch Me if You Can—JavaScript Obfuscation, Oct. 26, 2020.", https://www.akamai.com/blog/security/catch-me-if-you-can-javascript-obfuscation.

(Continued)

*Primary Examiner* — Amare F Tabor

(57) ABSTRACT

Systems and methods for obfuscating data. The technology herein can be used to produce an obfuscated output that exhibits no easily discernible pattern, making difficult to identify or to filter using regular expressions, signature matching or other pattern matching. The output nevertheless can be reversed and the original data recovered by an intended recipient with a relatively low-cost of processing, making it suitable for low-powered devices. The obfuscation is stateless and does not require encryption.

10 Claims, 2 Drawing Sheets

(56) References Cited

OTHER PUBLICATIONS

Katz, O. , "Akamai Blog, Over 25% of Malicious JavaScript IsBeing Obfuscated, Oct. 19, 2021, 8 pages.", https://www.akamai.com/blog/security/over-25-percent-of-malicious-javascript-is-being-obfuscated.

Wikipedia, , "Armenian numerals, download on Oct. 27, 2021, 2 pages.", https://en.wikipedia.org/wiki/Armenian_numerals.

* cited by examiner

PATTERNLESS OBFUSCATION OF DATA WITH LOW-COST DATA RECOVERY

BACKGROUND

Technical Field

This patent application generally relates to the obfuscation of data, and more particularly to obfuscation of data exchanged between network devices, such as clients and servers.

Brief Description of the Related Art

It is useful to be able to obfuscate a set of data such that the obfuscated data has no easily discernible pattern but the intended recipient can recover the data. If the obfuscated data has no discernible pattern, an intermediary will have difficulty filtering messages due to the data (e.g., via a regular expression or signature match). While encryption can provide such capabilities, it requires complex key management infrastructures when used in distributed computing systems. Furthermore, it is computationally heavy. It would be useful to provide obfuscation that can be reversed in a relatively lightweight computational manner by a recipient.

One example (non-limiting) of a use case for the above technology is in the area of client-server communications. Web content may contain information that the server wants to transmit to the user agent on a client device (e.g., the browser execution environment for scripts, etc.), while preventing intermediary devices or software from reading and/or filtering against such information. Such information may be present in URLs, web pages, or in AJAX type calls from the client to the server, or vice versa. Hence, client server and distributed computing systems represent one use case.

Note that the foregoing is just one example, and the need for lightweight deobfuscation may arise in other contexts.

This patent document discloses improved methods and systems for obfuscating data and in embodiments can provide desirable attributes as described above. The teachings presented herein improve the functioning of a computer system itself, as well as that of a larger distributed system having many computers. Those skilled in the art will understand these and other improvements from the teachings hereof.

BRIEF SUMMARY

This section describes some pertinent aspects of this invention. Those aspects are illustrative, not exhaustive, and they are not a definition of the invention. The claims of any issued patent define the scope of protection.

Systems and methods for obfuscating data. The technology herein can be used to produce an obfuscated output that exhibits no easily discernible pattern, making difficult to identify or to filter using regular expressions, signature matching or other pattern matching. The output nevertheless can be reversed and the original data recovered by an intended recipient with a relatively low-cost of processing, making it suitable for low-powered devices. The obfuscation is stateless and does not require encryption.

The claims are incorporated by reference into this section, in their entirety.

BRIEF DESCRIPTION OF THE DRAWINGS

The invention will be more fully understood from the following detailed description taken in conjunction with the accompanying drawings, in which.

Figure 1:
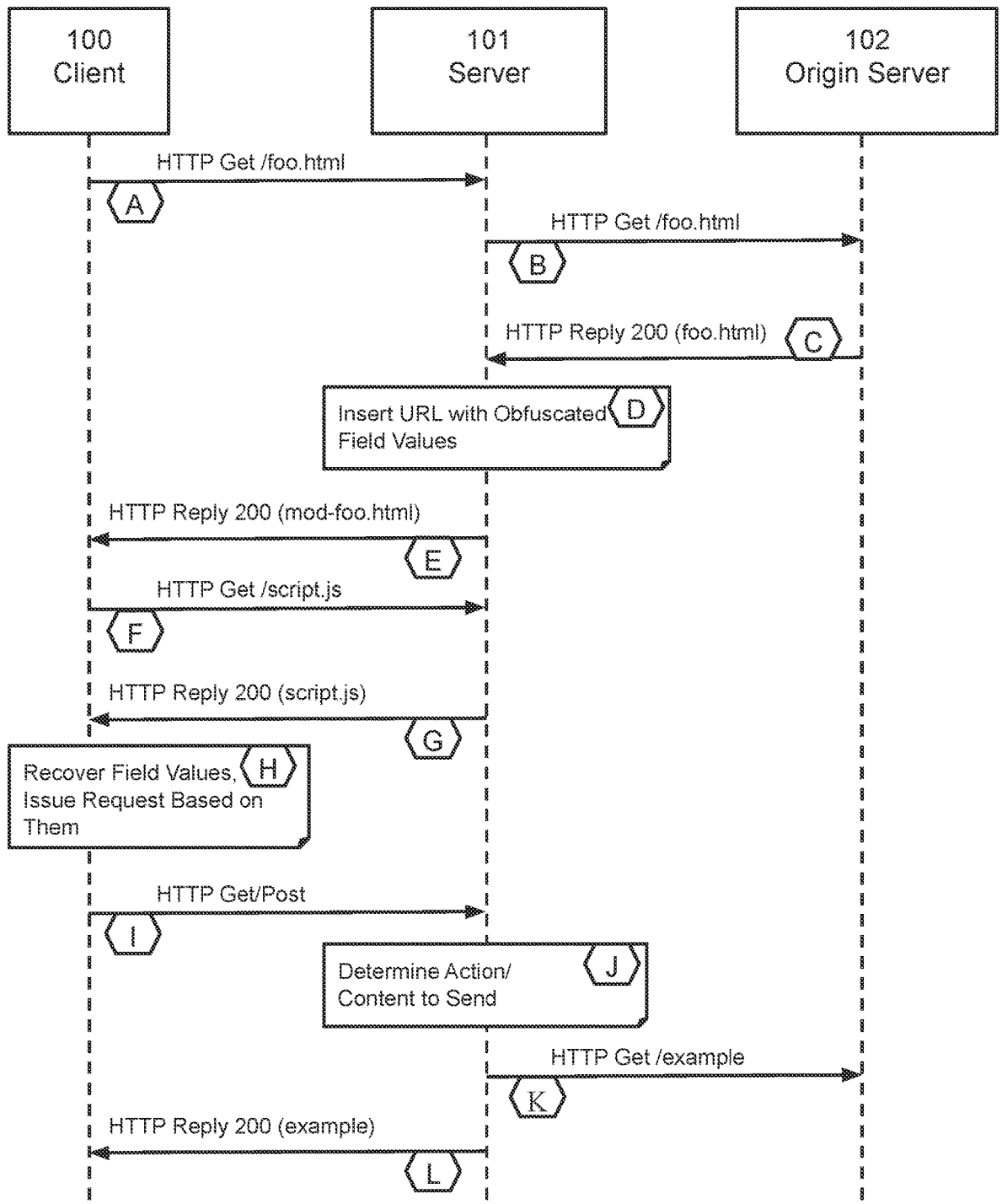
FIG. 1 is a sequence diagram illustrating the flow of messages between a client, proxy server, and origin server, in accord with one embodiment of the invention; and, FIG. 2 is a block diagram illustrating hardware in a computer system that may be used to implement the teachings hereof.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, GraphQL, HTTP versions 1.1 and 2, HTTP over QUIC, MQTT, TCP/IP, and UDP, is assumed.

All references to HTTP should be interpreted to include an embodiment using encryption (HTTP/S), such as when TLS secured connections are established. While context may indicate the hardware or the software exclusively, should such distinction be appropriate, the teachings hereof can be implemented in any combination of hardware and software. Hardware may be actual or virtualized.

Overview

A sending device can Obfuscate a data string (such as a portion of a URI, path) before sending it to a recipient device using obfuscation techniques that produce a patternless output but are relatively light computationally for the recipient device to reverse. The recipient device can be programmed natively with logic to reverse the obfuscation and recover the data string. Preferably, however, a lightweight set of instructions is all that is necessary to reverse the obfuscation. Such instructions are referred to herein as a "recovery method". The recovery method can be delivered, e.g., in the form of a script, to a process on the recipient device, such as a script execution environment provided by a browser. The recovery method may be placed in its own separate script, or in many embodiments, simply represent a portion of a larger script. That larger script could be a script that is intended to provide a client-side application, such as performance monitoring and beaconing, bot detection, malware detection, page integrity analysis, information gathering for device posture analysis, (sometimes referred to as a "product script"). However, such a "product script" is not required.

Such obfuscation techniques can be used to carry arbitrary field values (in the data string) and to recover those field values. No encryption or cryptographic keys are required, keeping the process efficient and eliminating the need for key management.

Initial Obfuscation

Assume a set of four data fields, A, B, C, D, each of which is a Boolean value, tore (1) or false (0). Further assume it is desired to communicate these four data field values to a process executing on a recipient device, e.g., to set parameters to control or configure that process.

An example non-obfuscated token for ABCD would be 1010. To obfuscate these values, the system uses a mapping from the value to a pair of characters consisting of letters and/or numbers. The mapping may be defined explicitly, i.e., "field A, value 1=a8", etc., hut preferably the mapping is a set of rules based on attributes of the pair characters, such as whether they are both consonants, both vowels, whether they are in alphabetical order, whether a vowel is paired with an even number, a pair of odd numbers, and so on. Accordingly, there are multiple ways to express the value for a field. For example, if the rule was that a true value for field B is expressed as a consonant paired with an odd number, the value could be encoded as t3, d7, p9, and so on.

The mapping definition, whether explicit or rule-based, is referred to herein as a "dictionary".

The system may use multiple dictionaries. Given a set of field values as an input, the system can select the dictionary to use based on, for example, the date/time (which provides a rotation or cadence), the platform tenant for whom the data is being obfuscated (in a multi-tenant use case) and/or a product identifier associated with that tenant. It could also be selected based on some aspect of the request to generate the obfuscated string, such as a client device type or identifier, user agent type. The selection could also be random, or a hybrid approach where some criterion above drives the selection of a set of dictionaries from which the system then selects randomly.

To use multiple criteria to select the dictionary, the system can compute a hash over the multiple criteria and use this value to select from the dictionary.

While the process has been described using Boolean flags (1 or 0) as the data field values, the teachings hereof extend to other types of fields. For example, the field values could be ternary, or represented by multiple flags. Or the field values could be tied to other symbols, e.g. hex characters encoding such that each character represents one of sixteen states or pieces of information. Dictionaries are not limited to mappings between alphanumeric characters, any character or symbol set may be used, such as ASCII, etc.

Padding

To further obfuscate, padding can be added to the result of the initial obfuscation step. In one embodiment, padding has N characters, where N=0,2,4 characters and the value of N is selected randomly. Preferably the padding is concatenated to the front (prepended) or end (appended) of the output of the initial obfuscation step.

For example if you had only 1 state field it could look like ab, abed or abfgh4, where ab stands for state field and remaining is the padding 0/2/4.

In this case, the recovery method must be configured to read twice the number_of_state_fields characters that are declared in the configuration that is driving the obfuscation.

Generation of Recovery Method

As mentioned, the system preferably generates a set of instructions to recover the original field values (the "recovery method"). This set of instructions can be written in Javascript or other language that is suitable for just-in-time compilation and execution in a client side engine or plugin, A given recovery method is generated (or selected) with knowledge of the dictionary selected. The given recovery method also contains instructions for locating the field values being incorporated into the obfuscated string and ignoring the padding (e.g., if padding is being appended, read the first N character pairs only, ignoring the padding characters after). The particular number of field values can vary but will depend on the product using the obfuscation service and/or the data field values that are needed.

Scripts providing the recovery method could be generated on the fly; alternatively, a library of such scripts could be generated ahead of time (that is, before the client request) and each dictionary associated with a given script from the library. The server can then modify the script as needed at the time of serving the obfuscated string with the field value location (which may depend on the particular payload that is being sent).

The sender can deliver the recovery method to the intended recipient along with the obfuscated string (e.g., in the same message), or asynchronously. In addition, the recovery method can be delivered out of band.

Example of Obfuscation

Assume a use case where four fields are used: Enabled. EastCoastPoP, WestCoastPoP, Service, where Enabled turns a feature on/off, the EastCoastPoP and WestCoastPop determine a network device/datacenter to contact, and Service determines which of two different services are being invoked on the client. The non-encoded token will be 1010.

To obfuscate these values the system pseudorandomly selects a dictionary based on date/time and a unique identifier for the tenant or hostname. Assume that the selected dictionary indicates that the value true is represented by, for example, a consonant and vowel or odd number pair in any order (ro, il, 3f . . . ), and a false value is represented by double consonants or a consonant and even number as false value (sd,tr,r4 . . . ). The character pair to use may be randomly selected from the many possibilities that meet the definition from the dictionary. Given these pairs will be generated randomly, even if from the Javascript code this information can be extracted from the communication channel, the Obfuscated string won't be easily regex detectable. The encoded value will look like (fos4ewtr or iqrtum3k).

The recovery method is aware of the order of the values set in the obfuscation. The recovery method can read and understand the values and at the same time the value won't be regex detectable.

While the foregoing example was directed to Boolean values, the technique is not limited to Booleans. For example, if the field value were an integer, the dictionary could define how to represent each digit in a decimal system 0-9. If the value were above 9 then these representations could be concatenated to represent the double-digit (or more) integer. Likewise a dictionary could be provided that maps every alphabetic character to a new pair of characters or other representation.

As mentioned, a recovery method must be provided to de-obfuscate the string and recover the values. An example of a recovery method for this purpose, assuming the example above, is as follows:

```
JS to convert Encoded State Fields convert_encoded_state_fields=(enc_str)=>

{ var output="";

var vowels="aeiouy13579", var i=0;

str=enc_str.toLowerCase( );

while(1<str.length)

{ if (vowels·indexof(str[i])>=0||vowels·indexof(str[i+1])>=0)

output+=1;

else output+=0;

i=i+2

} console·log(output);

} convert_encoded_state_fields("fos4ewtr");

Output>1010
```

Additional Information

The encoded state fields can be generated based on:
<encoded-state-fields> encoded pairs of string delimited by a colon (:), e.g 1:abc 0:xyz
<unique-id> customer identifier to randomize obfuscation per customer, this field must be numeric.
<product-id> 3 letter identifier of the product
<cadence> to keep the result consistent for the period of time, weekly or daily, the default value is weekly.

The Boolean values are translated to 2 letter(letter number) pairs as described above. Padding can be added as described above. In many embodiments, based on a hash on cadence and uniqId, a new string is generated. In our example the <encoded-state-fields>0:AUTO 1:BM 0:ESSL 1:FF is encoded to "PHIPNIMD7" string with params as uniqId (customer id)=100 and cadence=weekly. This value will be changed every week or every day depending on the cadence.

Example Use Case

In one exemplary use case, the sending device is a web server and the recipient device is a client device that provides an execution environment for client-side execution of logic (e.g., JavaScript) in connection with a web page served by the web server, e.g., in a browser or similar user agent. The web server desires to communicate with the instance of client-side logic, which is performing some task and/or providing a service to or about the client. To this end, the server sends a cleartext (not encrypted) message with a string representing one or more field values, obfuscated as described above. The obfuscated string is effectively patternless to intermediate network devices (i.e., even to those devices that may be able to do deep packet inspection and decrypt the TLS layer if the message is encrypted) as well as to other processes running on the client device.

The web server also delivers a set of instructions forming the recovery method to the client device to de-obfuscate the string and recover the field values for use in the client-side execution environment. The recovery method may be delivered synchronously or asynchronously with the suing, and/or either in-band or in an out of band channel.

In one embodiment, the field values may represent control parameters/configuration-information for the client-side logic to perform, e.g., gathering client-side telemetry, performance monitoring, bot detection, device characterization, or the like. The patternless nature of the obfuscated string helps to avoid client-side filters that might otherwise block the content based on regular expression matching intended for, e.g., ad-blocking. Hence the obfuscated string may even be included as part of a URL sent to the client device.

FIG. 1 illustrates the above use case, with some modifications and enhancements. In FIG. 1, at step A, the client 100 sends an HTTP request for web page foo.html to the server 101 (e.g., a server in a service platform; such as a CDN or otherwise). The server 101 fetches the html document from an origin server 102 at steps B and C, in accord with conventional proxy server operation.

At step D, the proxy server 101 inserts a URL with the Obfuscated Field Values into the document. The Obfuscated Field Values can be included in the URL path, for example. In this example, the inserted URL points to a script that contains instructions for the desired client-side application, such as performance monitoring and beaconing, bot detection, malware detection, page integrity analysis, information gathering for device posture analysis, and other applications as mentioned earlier. The script also contains the recovery method. In other words, the recovery method simply is a portion of the larger script, in this embodiment. (Note that in other embodiments, the URL: could point to an image, or any kind of content, or it might not even be used to request content by the client. As long as the client has a way to know the recovery method, it can detect the field values in the URL.) At step E, the proxy server 101 sends the modified HTML document to the client 100.

Note that the message E could also contain other obfuscated or encrypted values which were generated in some other way, and include checksums or error checking and verification codes, but this is not crucial to the teachings of this patent document.

At steps F, G and H, the client (or more particularly, the browser user agent) follows the URL to fetch the script.

Because the fetched script contains the recovery method needed to de-obfuscate, the client is now able to extract and read the Obfuscated Field Values. The client uses those values to configure and/or control the actions that it takes with respect to, e.g., performance monitoring and beaconing, bot detection, malware detection, page integrity analysis, information gathering for device posture analysis, and other applications as mentioned earlier. The fetched script can be written such that, the client is caused to issue a message((e.g., an HTTP Get or POST) back to the server 101 for more instructions (e.g., another script or more obfuscated field values). This is shown at label I in FIG. 1.

In some embodiments the client can send information from message E back to the server 101, which the server is able to verify and execute additional information using conventional techniques such as checksums or verification hashes. This information may be an obfuscated URL (e.g., the URL for the script that was delivered in E) or encrypted token. However, that is not necessary to the teachings of this patent document.

At step 1, the client 100 can send information back to the server 101 as result of the script execution. The information may contain such things as, e.g., data about the client side environment. At step J, the server 101 receives message I and determines what action to take in furtherance of the particular functionality that is being applied (i.e., performance monitoring, bot detection, etc.). The action may include sending additional content (e.g., additional obfuscated values, or an additional script tailored to the client-side environment) to the client. This additional content is referred to as the "example" content in FIG. 1 at steps K and L.

Other Use Cases

As mentioned above, the teachings hereof can be used to avoid detection by intermediary client side filters. One example of a client side filter is an ad-blocker installed in a browser or other user agent that scans URLs for patterns associated with advertising platforms. In such situations, the state fields could be a pattern that a regular expression might detect. By providing a lightweight, rotatable obfuscation, it becomes infeasible to write regular expressions against the obfuscated state fields in the URLs, thus providing an anti-adblock function.

When the obfuscated data and the recovery method are delivered through separate communication channels, the techniques described herein can provide a kind of lightweight authentication by virtue of the fact that it is difficult for the recipient device to recover obfuscated data, unless it has the script. Hence it may be used alone, as a lightweight form of authentication, or as a second factor in multi-channel authentication systems.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs, Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 2:
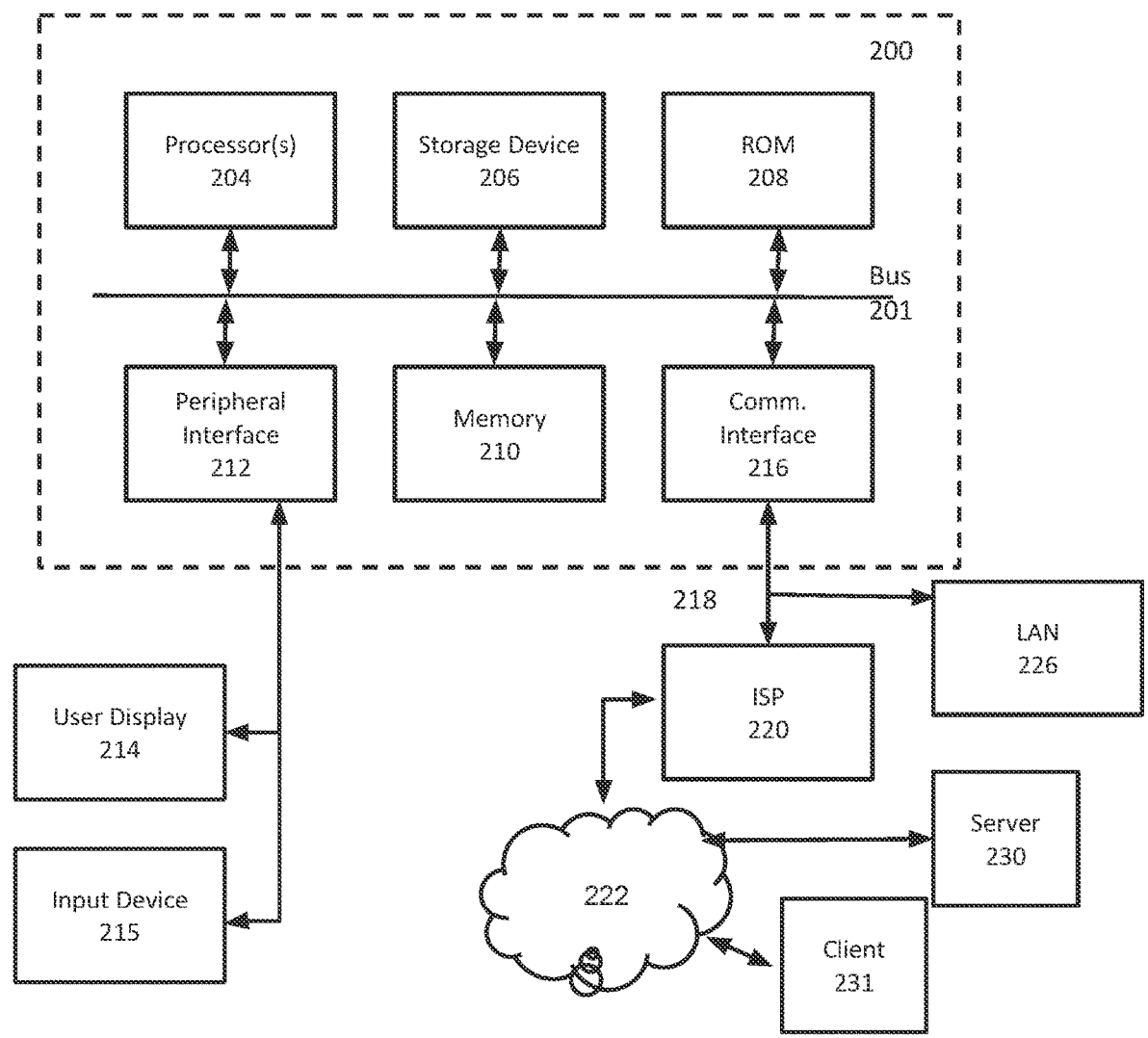

FIG. 2 is a block diagram that illustrates hardware in a computer system 200 upon which such software may run in order to implement embodiments of the invention. The computer system 200 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 200 includes a microprocessor 204 coupled to bus 201. In some systems, multiple processor and/or processor cores may be employed. Computer system 200 further includes a main memory 210, such as a random access memory (RAM) or other storage device, coupled to the bus 201 for storing information and instructions to be executed by processor 204. A read only memory (ROTI) 208 is coupled to the bus 201 for storing information and instructions for processor 204. A non-volatile storage device 206, such as a magnetic disk, solid state memory (e.g., flash memory), or optical disk, is provided and coupled to bus 201 for storing information and instructions. Other application-specific integrated circuits (ASICs), field programmable gate arrays (FPGAs) or circuitry may be included in the computer system 200 to perform functions described herein.

A peripheral interface 212 may be provided to communicatively couple computer system 200 to a user display 214 that displays the output of software executing on the computer system, and an input device 215 (e.g., a keyboard, mouse, trackpad, touchscreen) that communicates user input and instructions to the computer system 200. However, in many embodiments, a computer system 200 may not have a user interface beyond a network port, e.g., in the case of a server in a rack. The peripheral interface 212 may include interface circuitry, control and/or level-shifting logic for local buses such as RS-485, Universal Serial Bus (USB), IEEE 1394, or other communication links.

Computer system 200 is coupled to a communication interface 216 that provides a link (e.g., at a physical layer, data link layer,) between the system bus 201 and an external communication link. The communication interface 216 provides a network link 218. The communication interface 216 may represent an Ethernet or other network interface card (NIC), a wireless interface, modem, an optical interface, or other kind of input/output interface.

Network link 218 provides data communication through one or more networks to other devices. Such devices include other computer systems that are part of a local area network (LAN) 226. Furthermore, the network link 218 provides a link, via an internet service provider (ISP) 220, to the Internet 222. In turn, the Internet 222 may provide a link to other computing systems such as a remote server 230 and/or a remote client 231. Network link 218 and such networks may transmit data using packet-switched, circuit-switched, or other data-transmission approaches.

In operation, the computer system 200 may implement the functionality described herein as a result of the processor executing code. Such code may be read from or stored on a non-transitory computer-readable medium, such as memory 210, ROM 208, or storage device 206. Other forms of non-transitory computer-readable media include disks, tapes, magnetic media, SSD, CD-ROMs, optical media. RAM, PROM, EPROM, and EEPROM, flash memory. Any other non-transitory computer-readable medium may be employed. Executing code may also be read from network link 218 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method for a sending device to obfuscate at least a portion of a message to be sent to a recipient device, comprising:
    receiving one or more field values for transmission to a recipient device in a message sent over a computer network;
    selecting a dictionary from a plurality of dictionaries based at least in part on an attribute of the message to be sent to the recipient device, where the selected dictionary maps each of the one or more field values to a plurality of sets of characters, each set having one or more characters;
    for each of the one or more field values, pseudo-randomly selecting one of the plurality of sets of characters given by the selected dictionary;
    replacing each of the one or more field values with the selected set of characters for the respective field value, to create an obfuscated string;
    inserting the obfuscated string in the message and transmitting the message to the recipient device, wherein inserting the obfuscated string in the message comprises inserting the obfuscated string into a portion of a URL, and;
    providing a set of instructions forming a recovery method for execution on the recipient device to recover the one or more field values, and sending the recovery method to the recipient device, where said sending is performed any of (a) synchronously and (b) asynchronously to the sending of the message.

2. The method of claim 1, further comprising pseudo-randomly padding the obfuscated string with one or more padding characters.

3. The method of claim 1, wherein the dictionary provides an explicit mapping.

4. The method of claim 1, wherein the dictionary comprises a set of rules that map field values to sets of characters based on attributes of the sets of characters other than the value of their characters.

5. The method of claim 1, wherein the attribute of the message to be sent comprises any of: a date when the message will be sent; a time when the message will be sent; an identity of the recipient device, an identity of a content owner whose content is being delivered to the recipient device.

6. The method of claim 1, wherein the sending device comprises a server and the recipient device comprises a client device, the message being sent to a user agent running on the client device.

7. The method of claim 6, wherein the message supports any of the following on the client device: performance monitoring, malware detection, page integrity service, bot detection, client threat assessment, information gathering on client hardware or software environment.

8. The method of claim 1, wherein the URL points to a script that contains a recovery method for execution on the recipient device to recover the one or more field values.

9. A system for transmitting obfuscated information, comprising:
    a sending device that has one or more field values for transmission to a recipient device in a message sent over a computer network;
    the sending device operable to:
        select a dictionary from a plurality of dictionaries based at least in part on an attribute of the message to be sent to the recipient device, where the selected dictionary maps each of the one or more field values to a plurality of sets of characters, each set having one or more characters,
        for each of the one or more field values, pseudo-randomly select one of the plurality of sets of characters given by the selected dictionary,
        replace each of the one or more field values with the selected set of characters for the respective field value, to create an obfuscated string,
        insert the obfuscated string in the message and transmitting the message to the recipient device, wherein inserting the obfuscated string in the message comprises inserting the obfuscated string into a portion of a URL,
        provide a set of instructions forming a recovery method for execution on the recipient device to recover the one or more field values, and,
        send the recovery method to the recipient device, where said sending is performed any of (a) synchronously and (b) asynchronously to the sending of the message;
    the recipient device operable to:
        receive the message, and
        deobfuscate the obfuscated string;
    wherein the sending device and the recipient device each have at least one hardware processor and memory storing computer program instructions for execution on the at least one hardware processor to operate as above.

10. A non-transitory computer readable medium holding computer program instructions for execution on one or more hardware processors at a sending device, the computer program instructions including instructions for:

> receiving one or more field values for transmission to a recipient device in a message sent over a computer network;
>
> selecting a dictionary from a plurality of dictionaries based at least in part on an attribute of the message to be sent to the recipient device, where the selected dictionary maps each of the one or more field values to a plurality of sets of characters, each set having one or more characters;
>
> for each of the one or more field values, pseudo-randomly selecting one of the plurality of sets of characters given by the selected dictionary;
>
> replacing each of the one or more field values with the selected set of characters for the respective field value, to create an obfuscated string; and,
>
> inserting the obfuscated string in the message and transmitting the message to the recipient device, wherein inserting the obfuscated string in the message comprises inserting the obfuscated string into a portion of a URL, and;
>
> providing a set of instructions forming a recovery method for execution on the recipient device to recover the one or more field values, and sending the recovery method to the recipient device, where said sending is performed any of (a) synchronously and (b) asynchronously to the sending of the message.

* * * * *